(12) United States Patent
Zhao et al.

(10) Patent No.: US 9,935,866 B2
(45) Date of Patent: Apr. 3, 2018

(54) SYSTEMS AND METHODS FOR LAST MILE OPTIMIZATION OF TRANSMISSION OF REAL-TIME DATA

(71) Applicant: Agora Lab, Inc., Palo Alto, CA (US)

(72) Inventors: Bin Zhao, Shanghai (CN); Wei Li, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 132 days.

(21) Appl. No.: 15/052,820

(22) Filed: Feb. 24, 2016

(65) Prior Publication Data

US 2016/0254983 A1 Sep. 1, 2016

Related U.S. Application Data

(63) Continuation-in-part of application No. 14/500,960, filed on Sep. 29, 2014, now Pat. No. 9,479,412.

(Continued)

(51) Int. Cl.
*H04L 12/26* (2006.01)
*H04L 29/06* (2006.01)
(Continued)

(52) U.S. Cl.
CPC .............. *H04L 43/50* (2013.01); *H04L 12/18* (2013.01); *H04L 12/1827* (2013.01);
(Continued)

(58) Field of Classification Search
CPC . H04L 43/50; H04L 41/5038; H04L 12/1827; H04L 47/722; H04L 45/123;
(Continued)

(56) References Cited

U.S. PATENT DOCUMENTS 6,854,013 B2   2/2005   Cable et al.
7,305,464 B2 * 12/2007   Phillipi ................... H04L 29/06
                                                   709/223
(Continued)

OTHER PUBLICATIONS

USPTO, ISA/US, "Notification of Transmittal of the ISR and the Written Opinion of the International Searching Authority, or the Declaration," in PCT Application No. PCT/US2016/037118, dated Oct. 31, 2016, 22 pages.

*Primary Examiner* — Hashim Bhatti
(74) *Attorney, Agent, or Firm* — Kang S. Lim

(57) ABSTRACT

The present invention relates to systems and methods for last mile optimization for the transmission of real-time data. Pseudo-packets are sent to a last mile optimizer located at each of several 'best' servers. The last mile optimizers provide feedback regarding jitter, latency and packet loss of the pseudo-packets to determine quality of service for each of the servers. The server with the best quality of service is selected as the 'single best' server. A plurality of transporter algorithms may then be applied to pseudo-packets that are then sent to the single best server, and the quality of service for each transporter algorithm is subsequently measured for effectiveness. The transporter algorithms that are shown to be effective are combined together for the actual transmission of real-time data. Continuous monitoring of transmission quality allows for utilizing backup pathways upon detection of a problem, and negotiation of preferred transporter algorithms.

12 Claims, 12 Drawing Sheets

Related U.S. Application Data

(60) Provisional application No. 62/018,520, filed on Jun. 27, 2014, provisional application No. 62/018,522, filed on Jun. 27, 2014, provisional application No. 62/175,194, filed on Jun. 12, 2015.

(51) Int. Cl.

| | |
|---|---|
| *H04L 12/18* | (2006.01) |
| *H04M 3/22* | (2006.01) |
| *H04M 7/00* | (2006.01) |
| *H04L 12/721* | (2013.01) |
| *H04L 12/925* | (2013.01) |
| *H04L 12/24* | (2006.01) |
| *H04M 1/253* | (2006.01) |
| *H04M 1/725* | (2006.01) |
| *H04L 12/841* | (2013.01) |

(52) U.S. Cl.
CPC ........ *H04L 41/5038* (2013.01); *H04L 43/062* (2013.01); *H04L 45/123* (2013.01); *H04L 47/722* (2013.01); *H04L 65/403* (2013.01); *H04L 65/80* (2013.01); *H04M 3/2236* (2013.01); *H04M 7/0084* (2013.01); *H04L 41/0668* (2013.01); *H04L 43/08* (2013.01); *H04L 43/087* (2013.01); *H04L 43/0835* (2013.01); *H04L 47/283* (2013.01); *H04M 1/2535* (2013.01); *H04M 1/72547* (2013.01); *H04M 2250/62* (2013.01); *H04M 2250/74* (2013.01)

(58) Field of Classification Search
CPC ..... H04L 43/062; H04L 12/18; H04L 65/403; H04L 65/80; H04L 47/283; H04L 43/0835; H04L 43/08; H04M 3/2236; H04M 7/0084; H04M 1/72547; H04M 1/2535; H04M 2250/74; H04M 2250/62
See application file for complete search history.

(56) References Cited

U.S. PATENT DOCUMENTS

| | | | |
|---|---|---|---|
| 9,043,453 B1 | 5/2015 | Kielhofner et al. | |
| 9,479,412 B2* | 10/2016 | Zhao | H04L 12/18 |
| 2004/0030797 A1 | 2/2004 | Akinlar et al. | |
| 2004/0148363 A1 | 7/2004 | Hadi | |
| 2008/0247382 A1* | 10/2008 | Verma | H04L 65/80 |
| | | | 370/352 |
| 2011/0307541 A1 | 12/2011 | Walsh et al. | |
| 2013/0182788 A1* | 7/2013 | Amara | H04B 7/0426 |
| | | | 375/267 |
| 2014/0075452 A1* | 3/2014 | Supalov | G06F 9/5066 |
| | | | 719/313 |
| 2014/0136952 A1 | 5/2014 | Zhu et al. | |
| 2016/0248678 A1* | 8/2016 | Zhao | H04M 7/006 |
| 2016/0315993 A1* | 10/2016 | Li | H04L 45/123 |

* cited by examiner

SYSTEMS AND METHODS FOR LAST MILE OPTIMIZATION OF TRANSMISSION OF REAL-TIME DATA

CROSS REFERENCE TO RELATED APPLICATIONS

This application claims the benefit of and is a continuation-in-part of U.S. application Ser. No. 14/500,960 filed Sep. 29, 2014 by Bin Zhao et al. entitled "Systems and Methods for Improved Quality of a Visualized Call Over Network through Pathway Testing", which claims the benefit of U.S. provisional application Nos. 62/018,520 and 62/018,522 both filed Jun. 27, 2014, all applications are incorporated in their entirety by this reference.

This application additionally claims the benefit of U.S. provisional application No. 62/175,194 filed Jun. 12, 2015 by Bin Zhao et al. entitled "Systems And Methods For Improved Communication Packet Delivery Over A Public Network", which is incorporated in its entirety by this reference.

BACKGROUND

The present invention relates to systems and methods for improving the quality of a call over network through the optimization of packet delivery over the internet and other networks. Such systems and methods enable more efficient communications over networks than is currently available due to better communication fidelity. This results in faster and more productive calls, or any other real-time data transfer.

Currently, a number of platforms are available for call over network (CON) communications. These typically include audio and/or video calling capabilities that rely upon the internet (or other suitable network) in order to enable communications between two or more participants. Examples of current CON systems include Vonage, Skype, WebEx, and Facetime, for example. Each of these systems have some differentiating features, but predominantly operate via scheduling or otherwise initiating a call, and then transmitting and receiving audio and/or video material via the internet (and often other networks as well). In some of the more sophisticated CON systems, such as WebEx, participants additionally have the capability to share their computer desktop, and further, pass this functionality to other participants.

While these CON systems have done a lot to enhance causal communications, the larger impact of CON systems is arguably on in relation to how businesses operate. Traditionally, in-face meetings were required to fully engage other business partners. The conference call was available, become costly when used for international calls since they operate over traditional telecommunications infrastructures. These newer CON systems have further increased how easily remote participants can communicate effectively; however, there are still a number of problems that tend to plague existing CON systems.

For example, proper connectivity of all users in a CON system is routinely an issue. Often one participant can have trouble joining or hearing without the other participant's knowledge. Connectivity issues are often sources of inefficiencies for call over network communications. Indeed, one of the largest problems facing CON systems is the fact that data is typically transmitted via the internet, which is a "best effort network". Best effort network means that the data is transmitted with the best timing and quality reasonably possible. However, the data is transmitted over often torturous pathways, in sub-optimal conditions. As such, often timing and/or quality of the transmitted data are negatively impacted. Given that audio and video communications are done in real-time, these types of data transfers are very susceptible to transmission delays and/or packet loss.

Traditional call over network systems handle this reduction in call quality and/or timing by reducing high data demanding communications. For example, in Skype, the video portion of the call may have a reduced quality, or may be halted altogether. Additionally, these existing systems simply drop the call if the timing and/or quality gets below a threshold. The thinking behind these dropped calls is that the inconvenience of not being able to communicate is less burdensome than a bad connection.

While there is some merit to this business model, there are some circumstances where communication is required, even in sub-optimal network conditions. This can be especially true where a number of participants are engaging in a conference call. Here schedules are often difficult to coordinate, and as such the need to communicate via that medium, and at that time, are magnified.

Typically, when the participants are located relatively near one another, in a location with a decent internet backbone, these measures are sufficient to ensure basic levels of communication quality. However, when participants are more remotely located (for example on different continents), these measures may simply be insufficient in order to produce decent communication.

Indeed, for a decent voice over internet protocol (VoIP) call, total latency should be less than 400 ms, and have a packet loss of less than 2%. In contrast, the typical jitter for data between China and the United States can vary from a few hundred milliseconds to a few seconds. This is in addition to a 100-160 ms latency. Packet loss between China and the United States often varies from 0 to 100%. Clearly, the internet infrastructure is sub-optimal for communications from China to the US. Other global locations vary in their suitability for communication as well.

All of these drawbacks to existing CON systems require that callers repeat information more often, and reduce efficiency for all members. Moreover, in the extreme situation of a badly compromised network connection, existing CON systems are rendered inoperable. Impatient participants that have a good connection may quickly lose interest in the conversation as the pace seems unbearably slow, or as the calls are dropped. Other participants may leave the call missing much of what has been communicated. Often these participants don't want to ask for clarification too often due to respect for the numerous other participants' time. In the case of dropped calls, important communication may simply never happen.

It is therefore apparent that an urgent need exists for systems and methods for improving communication packet delivery over a network in order to improve the quality of a call over network. Such systems and methods provide optimization of the internet backbone, optimization of last mile delivery, and real time monitoring and mitigation technologies in order to achieve the best possible transmission outcomes given the infrastructure limitations present.

SUMMARY

To achieve the foregoing and in accordance with the present invention, systems and methods for last mile optimization of real-time data packet transmission are provided. Such systems and methods enable enhanced quality calling over the internet even across very large distances and number of relays by selecting the most robust servers.

In some embodiments, the systems and methods include a sending pseudo-packets to a last mile optimizer located at each of several 'best' servers. The last mile optimizers provide feedback regarding jitter, latency and packet loss of the pseudo-packets to determine quality of service for each of the servers. The server with the best quality of service is selected as the 'single best' server.

A plurality of transporter algorithms may then be applied to pseudo-packets that are then sent to the single best server, and the quality of service for each transporter algorithm is subsequently measured for effectiveness. The transporter algorithms include retransmission algorithms, FEC, simultaneous pathway, lower the encoder bitrate, sending multiple voice frames in a single packet, adaptive jitter buffering and PLC. The transporter algorithms that are shown to be effective are combined together for the actual transmission of real-time data.

The systems and methods also continuously measuring transmission quality of the real-time data, and upon detection of a problem switch transmission of the real-time data packets from the single best edge server to one or more of the several best edge servers. Further, the systems and methods may detect changes in the transmission jitter, latency and packet loss, and negotiating optimized transporter algorithms, including altering encoding and bitrate of the transmission, in order to overcome the changes in transmission quality.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
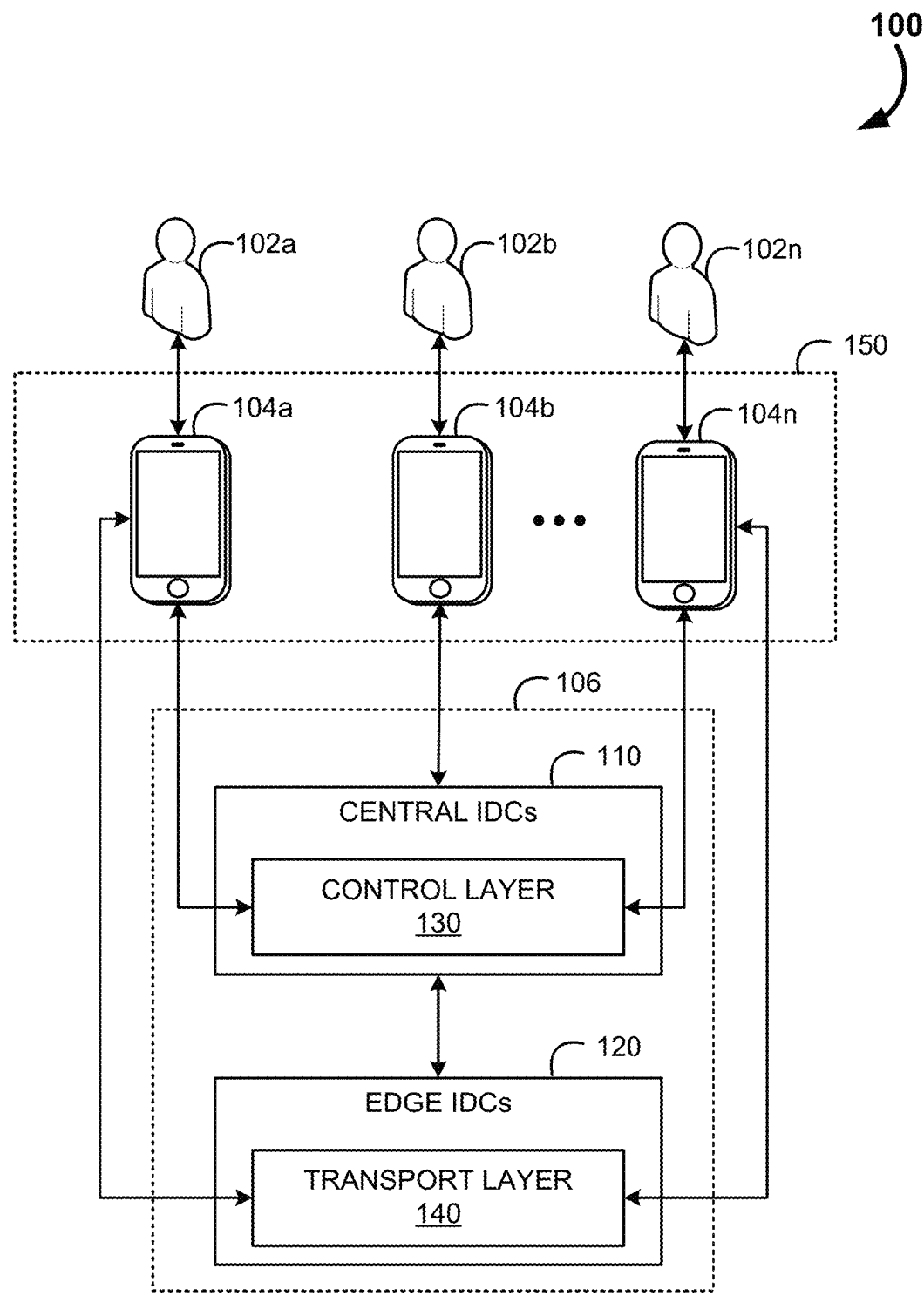
FIG. 1 is an example block diagram of a system for improving communication packet delivery, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The presently disclosed systems and methods are directed toward the improved delivery of real-time data packets over a network; and particularly with the enhancement of communication packets over the internet. As previously noted, a number of current CON systems are available. Each of these systems has some benefits compared against one another, but all of them fail to provide the improved call quality features and data transmission optimizations disclosed herein. For the sake of clarity, the presently disclosed call quality functions will be described as an integrated CON standalone system. However, despite this portrayal of the CON system with these quality features, it is also considered within the scope of this disclosure that the functionalities disclosed herein could be incorporated into an add-on module, capable of overlaying existing CON architectures. In such a way, callers could continue to rely upon Skype, for example, due to brand loyalty and robust back end servers, and yet still enjoy the added quality enhancements disclosed herein. As such, an overlay application for an existing CON system, or a fully integrated CON system are considered equally covered by the present disclosure.

The term "device" as used herein is intended to refer to any device to which a participant may communicate with via the CON. Often these devices are also referred to as "mobile devices" as one focus of such communication is with devices such as laptops, cell phones, and tablets. However, it should be understood that any device where communication is desired falls within the scope of the term "device".

Also note that the term "participant" is utilized to describe the user of a device who is engaging in a call. It is likewise understood that the terms "user", "caller", and "member" are likewise often utilized interchangeably with the term "participant".

Moreover, while the term "call" is utilized, and often referred to in relation to audio communication, the term "call" is intended to be broad enough to encompass any audio and/or video and/or real time data communication. Thus, for the sake of clarity, many of the examples will center on audio only conference type calling, but video calls, or calls whereby digital material or desktop screenshots are shared, or any real-time data transfers, are equally intended to be within the scope of the term "call".

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Systems for Improving Communication Packet Delivery Over a Network

To facilitate this discussion, FIG. 1 provides an example schematic block diagram for a system for improved communication packet delivery for enhanced call over network (CON) quality, shown generally at 100. In this example block diagram, a number of participants 102*a-n* are illustrated engaging a plurality of devices 104*a-n*. Note that for a successful call, only two devices, and a minimum of two participants 102*a-n* are required. However, as will be elucidated below, in conjunction with examples and embodiments, call quality improvements are especially helpful as the number of participants 102*a-n* increases due to the increased number of data pathways being relied upon.

Note that while a one-to-one ratio of participant to device is illustrated for the sake of simplicity, it is entirely within the scope of this disclosure that there may be multiple participants 102*a-n* on any one device if they are concurrently located.

As previously noted, devices 104*a-n* may refer to any number of device types, not only cell phones as illustrated herein. In some embodiments, the systems and methods disclosed herein may be particularly formatted in order to operate on such mobile devices, since call quality and ability to understand may be most heavily compromised on such mobile devices; however, in alternate embodiments the systems and methods of communication packet delivery improvement disclosed herein are equally able to be implemented on a wide array of devices (i.e., laptop and desktop computers, game consoles, dedicated teleconferencing equipment, etc.).

The devices 104*a-n* collectively make up an application layer 150 of the present system for packet delivery improvement. These devices 104*a-n* include applications capable of performing optimizations of last mile delivery The devices 104*a-n* the couple to one another via a network 106. The network 106 most typically includes the internet, but may also include other networks such as a corporate WAN, cellular network, or combination thereof, for example. The network 106 may consist of multiple central data centers 110, and a larger number of edge data centers 120. When the network 106 is the public internet, the data centers are typically referred to as internet data centers (IDCs). There are a handful of central IDCs 110 already distributed across the globe. There are many more edge IDCs 120 likewise distributed. IDC distribution typically follows population centers and internet usage rates.

As previously disclosed, one of the largest problems facing CON systems is the fact that data is typically transmitted via the internet, which is a "best effort network". Best effort network means that the data is transmitted with the best timing and quality reasonably possible. As such, the timing and/or quality of the data received are typically compromised.

Typically, data transferred over the internet can be repaired as retransmissions are received, or as late packets are re-integrated. However, in the context of human discussions or any other real-time data transfer, waiting for late packets, or packet retransmission, is often undesirable due to the latency caused in the speech/data latency. People naturally wait a very short time after they finish speaking before they become impatient and expect some kind of response. The period of time varies by individual, and by culture; however, typically 200-800 ms delay between the end of a speaker talking, and a response causes the speaker to wonder if they were heard. If there is a response delay of longer than 200-800 ms, the speaker will often repeat information, or query the other participants' whether they heard what was spoken. This makes sense in face to face communication, but in circumstances where there are network delays, this repetition often causes speakers to talk over one another, or otherwise miscommunicate.

Given current internet infrastructure conditions, latency between China and the US exists at approximately 100-150 ms, with a jitter lasting a few hundred milliseconds to a few seconds in length. Packet loss numbers are even more unpredictable: varying between very little losses to almost complete packet loss. Communication between other locations is often subject to similar, or worse, network restrictions.

As previously mentioned, in order to have effective CON, a latency of less than 400 ms total is desired, with packet losses of less than 2%. Clearly, for CONs occurring between the US and China, these conditions are often not met. Thus, in addition to the established infrastructure already in place for the global internet, a control layer 130 is deployed across several central IDC 110 servers, and a transport layer 140 is distributed across tens of edge IDC 120 servers in order to effectuate transmission optimizations.

The transmission optimizations employed by the current system are twofold in order to address each possible source of packet degradation. First, just before a call is initiated, a last mile optimization is performed in order to select the best server for device connection and algorithm selection. Secondly, during a call over the network, a real time optimization may be employed to dynamically reroute transmission pathways based upon changing network conditions. These systems and methods will be described in more detail below.

Figure 2:
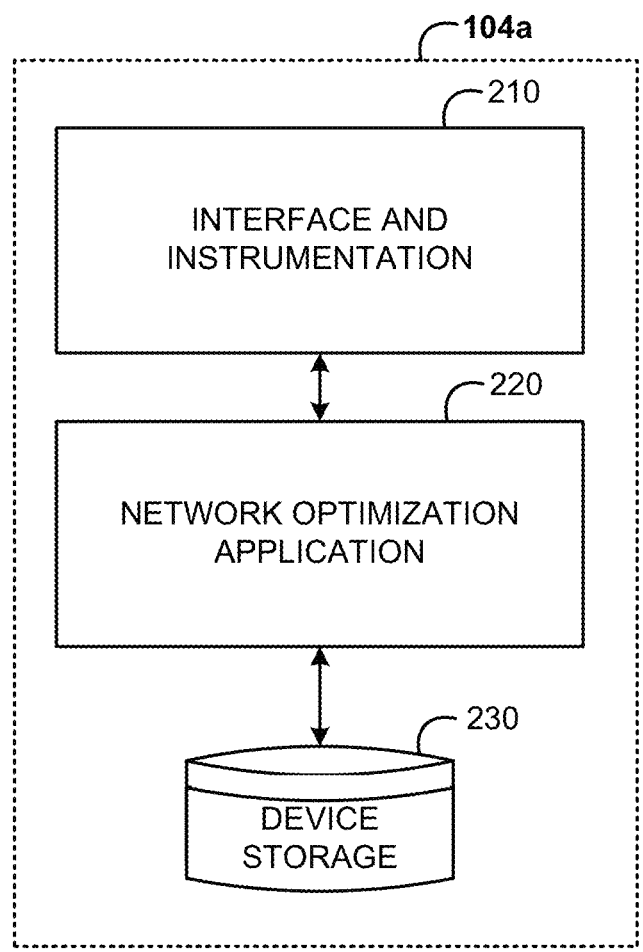
FIG. 2 is an example block diagram of a device utilized to engage in a call over network, in accordance with some embodiment.

Much of the call quality improvements provided herein requires interplay between the devices 104*a-n* and the associated software stored thereon, and the servers located in the control layer 130 and transport layer 140. FIG. 2 is an example schematic block diagram for one such communication device 104a used in conjunction with a call over network 100. This illustration the device is seen as including at least one interface and the instrumentation 210 required to effectuate the call. At a minimum this includes one or more displays, speaker, microphone, and input devices (touch screen, keyboard, etc.). The device 104a also requires a means to transmit data to and from the network 106. This may include a Wi-Fi connection, cellular connection, or other connection type as is appropriate for the present device 104a. In addition, it may be desirous to have additional functionality that required specialized instrumentation, such as GPS, vibration, biometric collectors, temperature sensors, etc.

The instrumentation and interface 210 couples, physically or logically, with a network optimization application 220 ("app"), which typically includes computer readable instructions on non-volatile device storage 230, and executed via one or more processors. In the instant example, the app 220 is responsible for communicating with the last mile optimizer (found in the transport layer 140), and an access controller (found in the controller layer 130). The app 220 receives information from the access controller regarding last-mile server, and engages the last mile optimizers to measure packet transmission quality.

Figure 3:
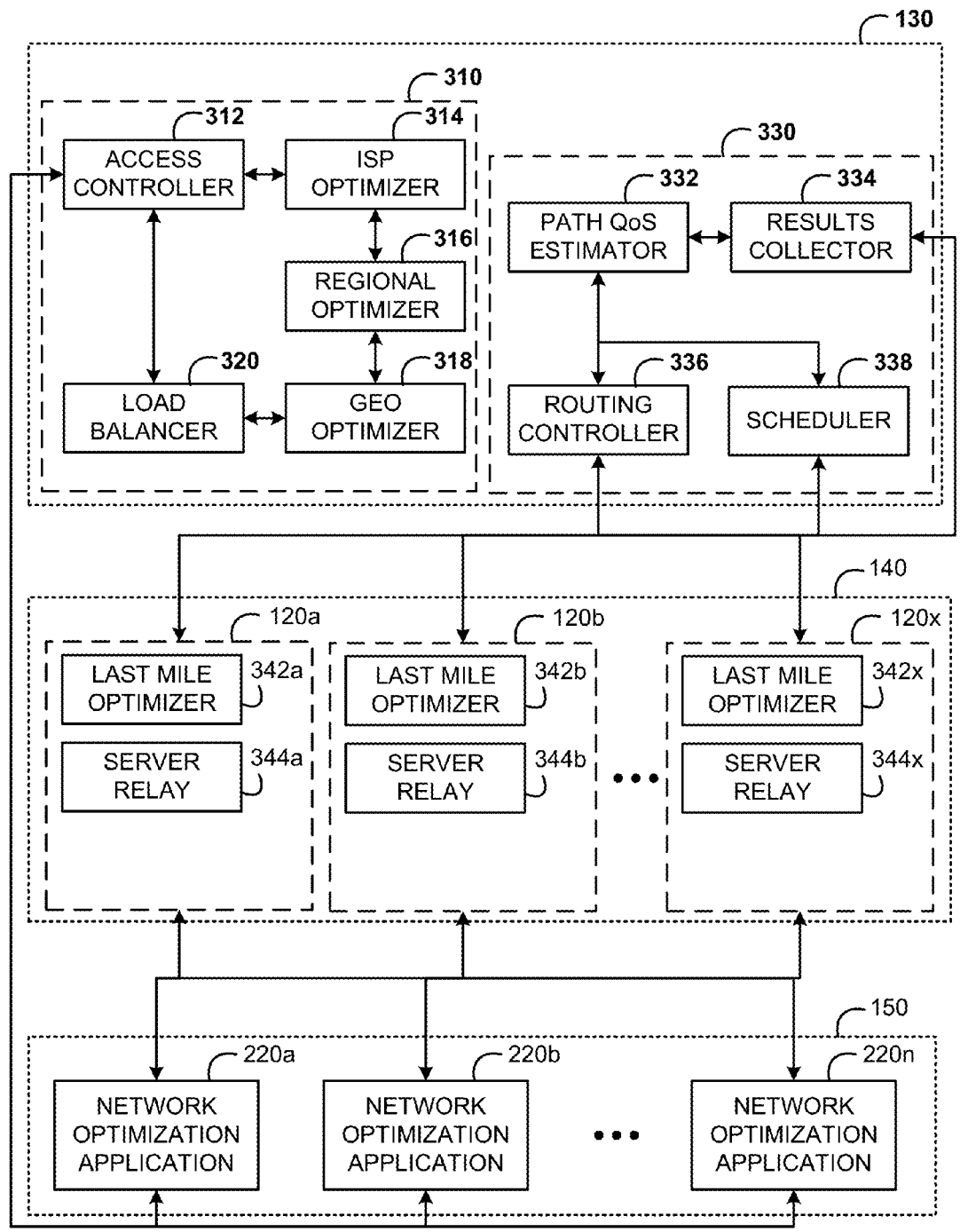
FIG. 3 is an expanded example block diagram of the system for improving communication packet delivery, in accordance with some embodiment.

FIG. 3 provides a more detailed illustration of the various components located within the controller layer 130, transport layer 140, and the application layer 150. As would be expected, a plurality of apps 220a-n exists within the application layer. The apps 220a-n correspond to their respective devices 104a-n.

Within the transport layer 140, there are tens of edge servers 120a-x. Each edge IDC 120a-x, includes a last mile optimizer 342a-x, and a server relay 344a-x. The last mile optimizer 342a-x runs in the background before the initiation of a call. The apps 220a-n measure the quality of transmissions between various last mile optimizers 342a-x, a selected by the access controller 312. This selection of the 'several best' servers for testing by the access controller 312 is performed based upon the applications IP address and geographic location information by the general optimizer 310, in some embodiments. In alternate embodiments, the general optimizer 310 may determine the best servers based purely upon regional and geographic variables and not rely upon ISP similarities.

When ISP is utilized, however, the access controller 312 leverages an ISP optimizer 314 which can determine the internet service provider (ISP) based upon the user's IP address by querying an IP database. The optimizer then selects other servers within the same ISP. However, if a suitable ISP server is unavailable, the ISP optimizer 314 would instead return a best match for a server based upon historical data best matches for the given ISP. In alternate embodiments, rather than matching the ISP, the system may either entirely ignore IP addresses, or may merely rely upon historic data of ISP's with the best past service.

The access controller 312 also receives feedback from a regional optimizer 316 which returns a listing of servers located in the same region as the device 104 running the app 220. For example, in some embodiments there are multiple servers in Nanjing and Hangzhou with the ISP China Telecom. For a user from Wuxi, the regional optimizer 316 would recommend Nanjing before Hangzhou, because Wuxi and Nanjing are both in Jiangsu province. In a similar vein, the geo optimizer 318 identifies the closest server to the user (not merely those in the region) for consideration. Once the possible server candidates are identified, a load balancer 320 looks at the relative loads each server is currently subjected to in order to identify the most likely server to be best suited to handle the data traffic. The access controller 312 then communicates this short list of the 'several best' servers to the app 220 for testing.

While the disclosed embodiments suggest that first the ISP is matched, followed by regional identification and subsequently geographic proximity, it is possible for alternate embodiments to operate in different manners. For example, in some embodiments, the region may first be optimized for, and subsequently the ISP match and geographic optimization may be performed. Likewise, in another embodiment the geographic optimization may be performed without any ISP or regional optimization. Likewise, possibly the geographic optimization may be initially performed, and verified by a regional optimization and/or ISP match. Clearly, this optimization for finding the best servers may be completed in a large number of ways based upon available data, resources, and desired output.

The above testing (regardless of embodiment) is known as the individual optimization for the device, and includes measuring latency, jitter and packet loss via the transmission of pseudo-packets to the last mile optimizers 342 identified in the general optimization, and receiving feedback regarding the quality of packet transmission. In this manner the 'several best' servers may be narrowed to the 'single best' server for the given app 220. Lastly, as will be described in greater detail below, the app 220 may additionally compensate for any residual network deficiencies by employing various transmission algorithms, and measuring each one's efficacy to select which algorithms to actually utilize during the call. Examples of the transmission algorithms include employ retransmission algorithms, FEC, lower the encoder bitrate, etc.

During transmission, the device and servers may undergo negotiations to improve data transmission fidelity. For example, if a receiver detects a bandwidth downgrade, it can negotiate with the sender (feedback loop) and the sender may then re-optimize the encoder and/or re-packetize the data in order to use less bandwidth. For example, since there is significant header overhead, larger packets may be more efficient for transmitting data in a constrained bandwidth situation (assuming packet loss is below an acceptable threshold). The system may thus continually negotiate and modulate the packet size and encoding based upon real-time network conditions.

The server relays 344a-x may identify issues during a call and immediately shift data traffic to backup pathways. As noted above, for any given device a listing of several best servers have already been determined. These several best servers may be continually tested in the background to maintain a short list of the very best servers for the device. In the event of a failure or unacceptable degradation in communication with the selected server, maintaining this list of backup servers allows for very rapid switching to a secondary server.

Information from the test programs found in the application layer 150 and the agents of the transporter layer 140 may be provided to a monitor (not illustrated) within the controller layer 130. The monitor may trigger alarms if there are failures in the system, and may also provide status updates and load information to the access controller 312 for its determination of the 'several best' servers to employ during the general optimization.

Figure 4:
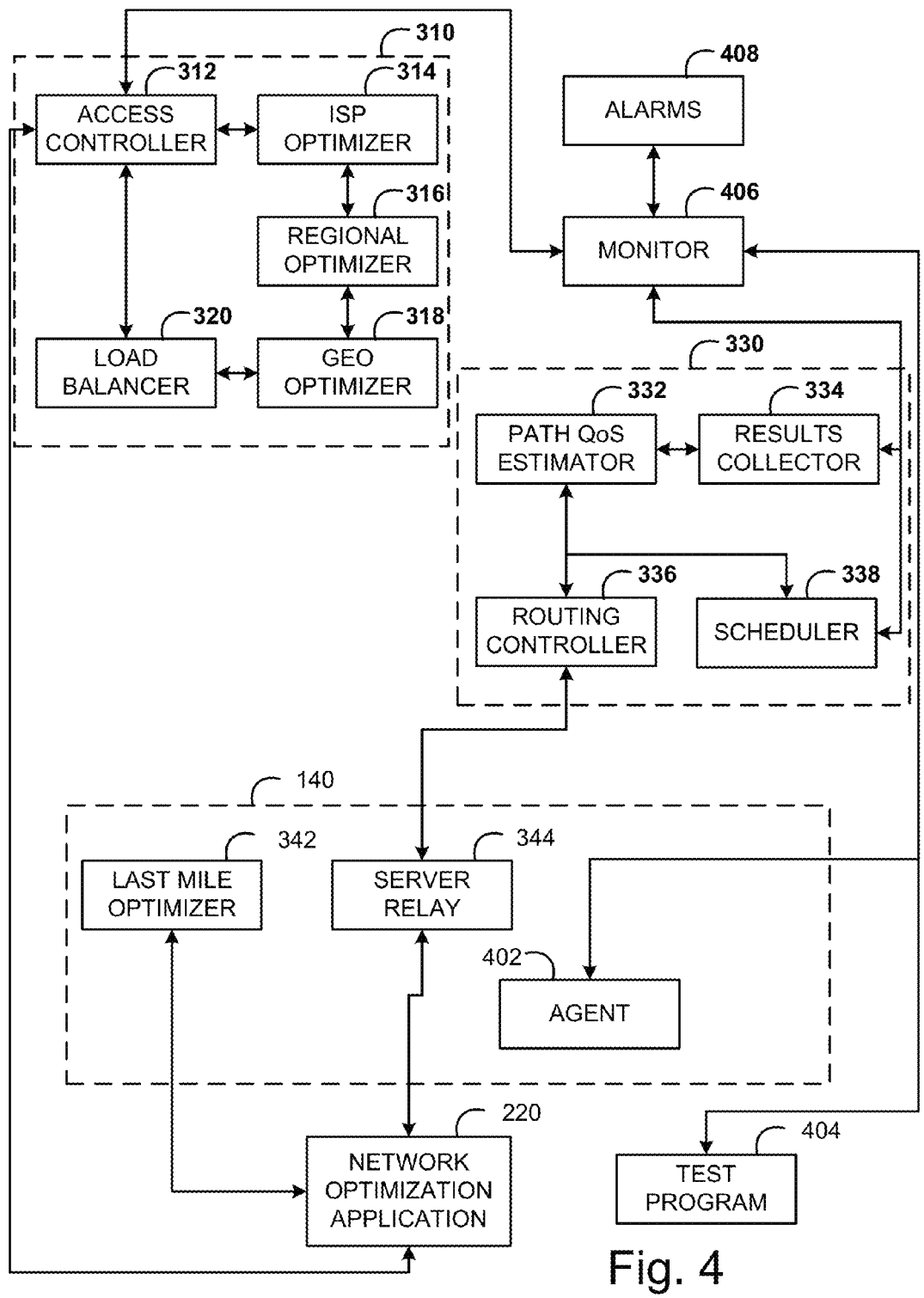
FIG. 4 is an example block diagram of the system for improving communication packet delivery with specific data paths identified, in accordance with some embodiment.

Continuing to FIG. 4, the same system architecture is illustrated with a reduction in the redundant components. The purpose of this figure is to more clearly illustrate the interconnectivity of the various components within the system architecture. Again, the network optimization app 220 is seen coupling to the access controller 312 in order to request the 'several best' servers which to test. These several best servers are determined by IP address and geographic location, as previously discussed, by the ISP optimizer 314, regional optimizer 316, geo optimizer 318 and the load balancer 320. Some of the information used to compute the general optimization, such as ISP lookup tables may be compiled over the course of time. Other data, such as system status and load levels may be collected from the monitor 406. The app 220 then interacts with the last mile optimizer 342 to test the 'several best' servers via packet exchange in order to narrow done to one or two 'best' server(s). If a best server is unable to be identified, a number of servers may be simultaneously utilized to try to ensure high packet transmission fidelity.

Lastly, once the best server is selected via the individual optimization, the application 220 and server relay 344 work to determine suitable transporter algorithms to employ during transmission, as previously discussed. This is known as the wireless optimization, and may include the testing of algorithms for retransmission on lost, FEC, simultaneous path, very low bitrate encoding, sending of multiple voice frames in one packet, adaptive jitter buffer, PLC, etc.

Collectively, the general, individual and wireless optimizations constitute the last mile optimization for the packet transmission. These optimizations may be employed just before a call initiation.

In some embodiments, the pseudo-packets sent for backbone optimization may be similar to voice data transmissions, which are approximately 40 bytes each, and sent every 20 ms smoothly with a consecutive sequence number i(1, 2, 3...). When the backbone optimizer 346 receives the pseudo packets I, it saves the packets receipt time ts(i) in milliseconds. Packet loss is simply determined by determining total packets received in a given time period versus expected packets. For example, given a 20 ms transmission rate in the above example, in a two second period, exactly 100 packets should be received. Thus loss rate is calculated as:

packet loss calculation — Equation 1

$$loss = \frac{100 - receivedPacketCount}{100}$$

Similarly, jitter may be calculated utilizing the packet receipt timing and the sequence number with the following:

jitter calculation — Equation 2 for $i = 1, 2, ..., 100$ $j(t) = ts(t) - l * 2o$ $l_{min} = \min(t)$ for $i = 1, 2, ..., 100$ $j(t) = j(t) - j_{min}\square$ Sort($j$)

jitter100 = $j(100)$ jitter95 = $j(95)$ jitter90 = $j(90)$

An agent 402 and test programs 404 collect information on the operation of the last mile optimizer 342 and edge servers. Data collected from the agent 402 and test programs 404 is provided to the monitor 406 in the controller layer 130. Major issues with the system may prompt one or more alarms 408 to be activated. Alarms 408 may vary depending upon the extent of the failure, and may include email and SMS notifications to engineers to resolve the issue. Additionally load conditions of servers and status of the optimizers is provided to the access controller 312 as noted above.

A large amount of statistical data is collected from the systems operation, and these statistics may be mined to generate suitable reports, including real-time reports about the quality of service of recent calls, as well as aggregate reports on a daily, weekly, and/or monthly basis. When the system encounters failures, it is also possible to diagnose the problem based upon the collected statistical data. Diagnostic, statistical collection, and reporting may all occur at the controller layer at a central IDC.

Lastly, as previously noted, as the call is actually occurring, the network fidelity is monitored by the edge servers, and if there is a pathway failure, the data may be re-routed over backup pathways.

Lastly, in certain circumstances it may be desirable to be able to manually control the route pathway, employ specific algorithms, or dynamically configure any component of the presently disclosed transmission optimization system.

Now that the architecture employed for the improvement of communication data transmission has been described in considerable detail, attention shall be redirected toward the processes employed to facilitate the efficiencies in the care.

II. Methods for Improving Communication Packet Transmission Quality

The following figures and descriptions are but some exemplary embodiments for the methods of improving communication data transmission. It should be realized that permutations and substitutions of the disclosed methods in order to improve performance of the transmissions is considered within the scope of this disclosure.

Figure 5:
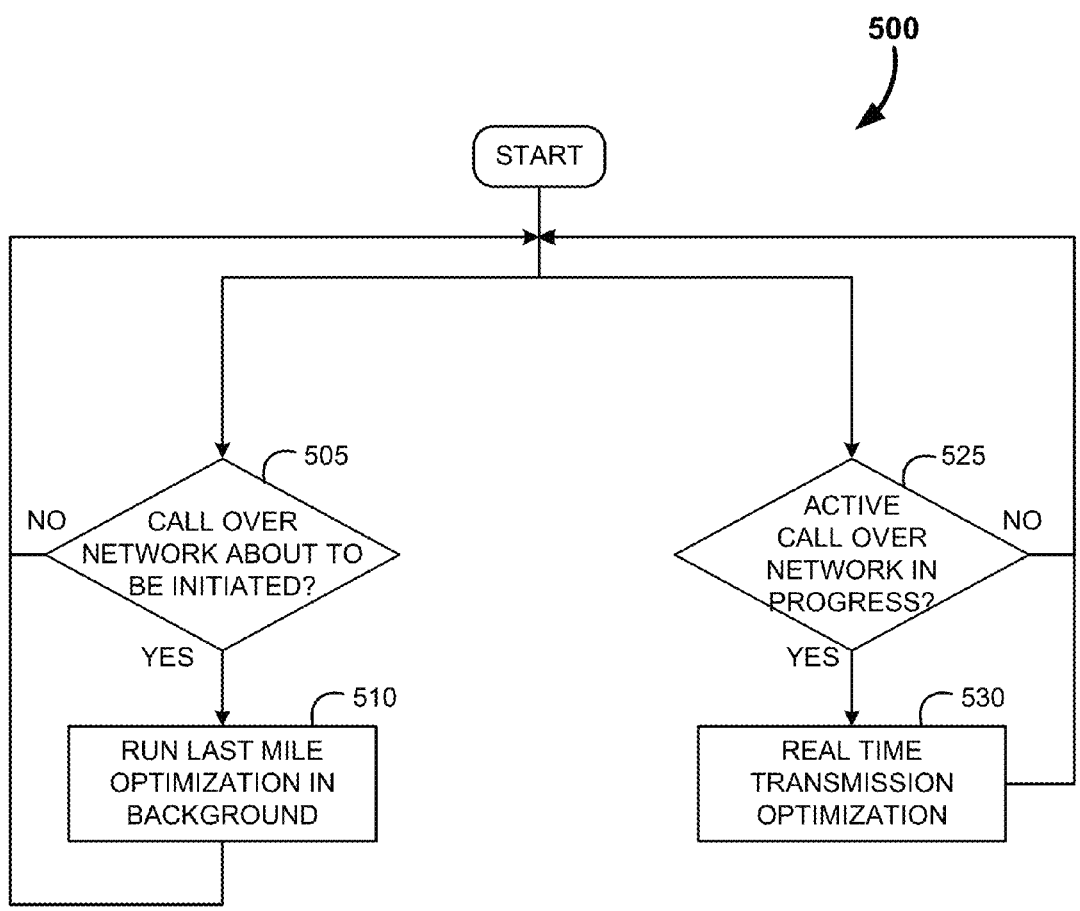
FIG. 5 is an example flow diagram for the process of improving communication packet delivery, in accordance with some embodiment.

FIG. 5 is an example flow diagram for the general process of improving of communication data transmission, shown generally at 500. As previously noted, this process has two main components. The last mile optimization (at 510) that is only executed right before a call over the network is to be initiated (at 505). The second optimization is employed only when the user is actively engaged in a call over the network (at 525) and includes the real time transmission optimization (at 530). These optimizations operate in concert with one another to provide the best call over network possible given an imperfect internet infrastructure. However, while these individual optimizations are particularly beneficial when operating in concert, they are also independent from one another, and each may be employed with or without the others based upon system needs and capabilities.

Figure 6:
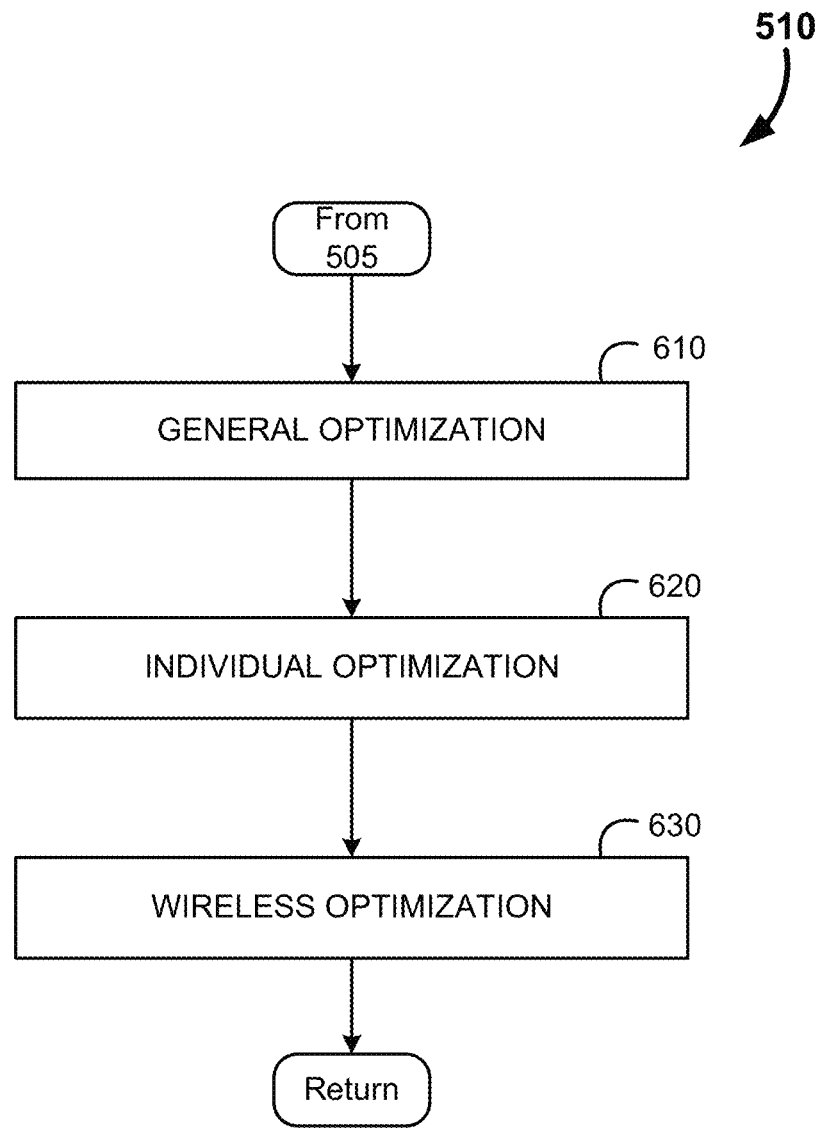
FIG. 6 is an example flow diagram for the sub-process of last mile transmission optimization, in accordance with some embodiment.
Figure 7:
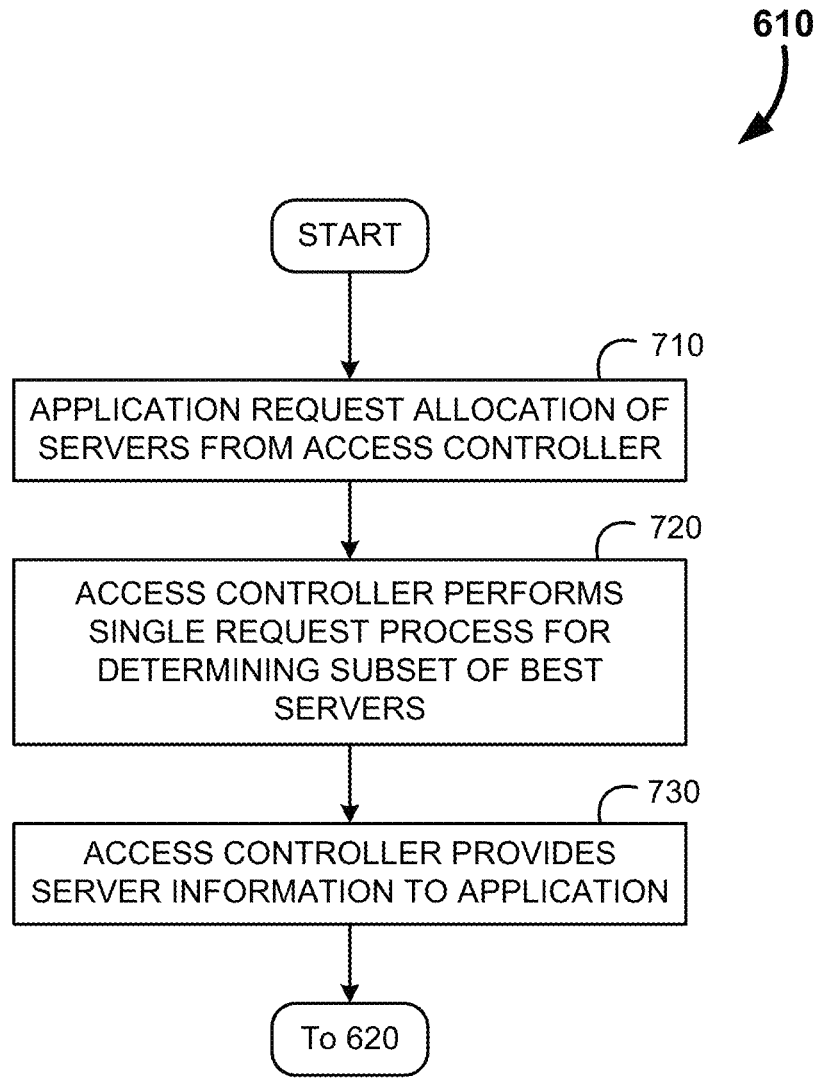
FIG. 7 is an example flow diagram for the sub-process of the general optimization for the last mile transmission optimization, in accordance with some embodiment.

The last mile optimization (510) is described in greater detail in reference to FIG. 6, where it is broken down into three discrete optimizations: a general optimization (at 610), and individual optimization (at 620) and the wireless optimization (at 630). The general optimization (610), provided in reference to FIG. 7, includes the application requesting allocation of servers from the access controller (at 710). The access controller performs a single request process for the determination of the best servers (at 720) by looking up the ISP gained from the user's IP address from a lookup of an IP database, and then returning the servers with the same ISP. Servers may also be narrowed by their regional location and relative load. The access controller is then able to provide the server information for these 'several best' servers to the application (at 730). As previously noted, in some embodiments the ISP matching may be avoided altogether. Likewise the optimization for the several best servers may be done in a different order: regional optimization, ISP match and geographic optimization, for example. Of course all other optimization ordering permutations are likewise possible in some embodiments.

Figure 8:
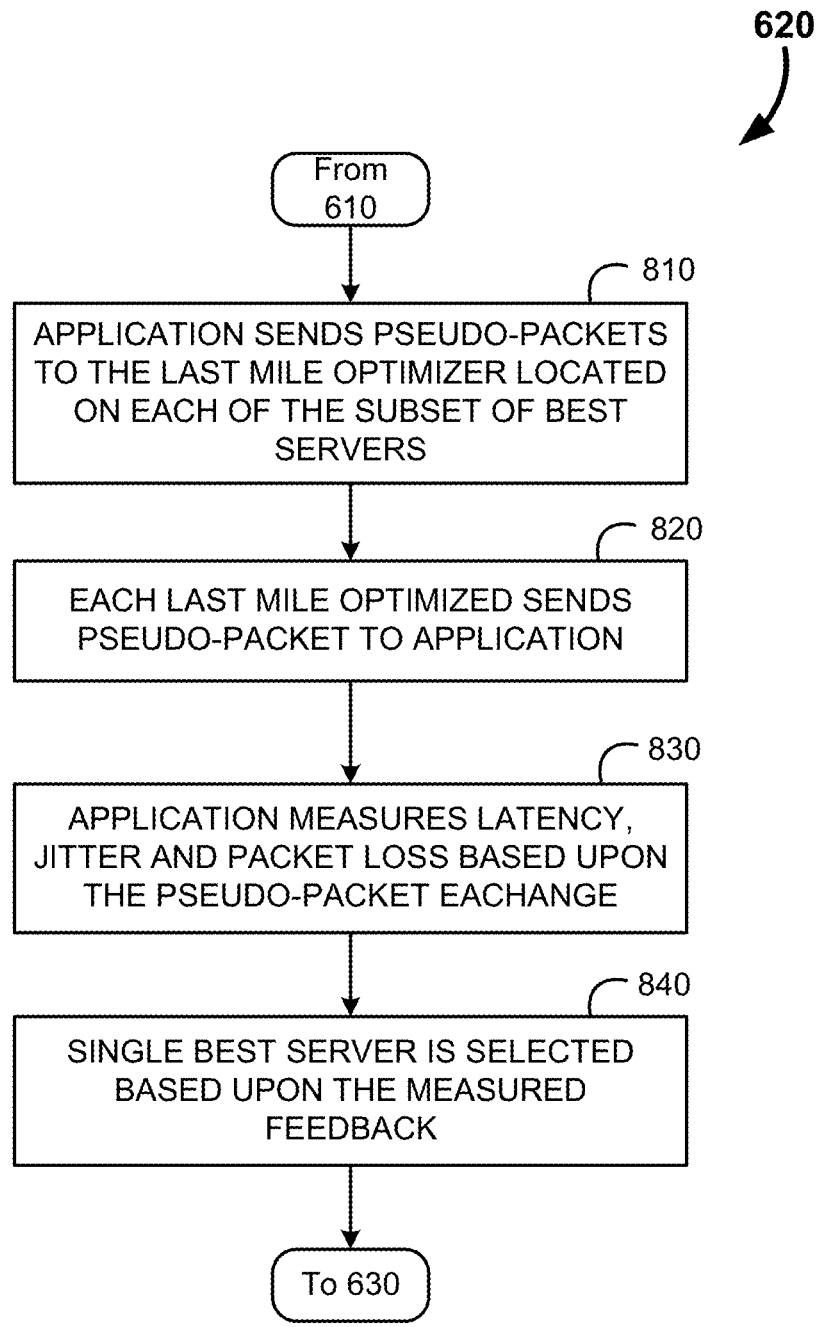
FIG. 8 is an example flow diagram for the sub-process of the individual optimization for the last mile transmission optimization, in accordance with some embodiment.

The individual optimization (620), provided in reference to FIG. 8, leverages these 'several best' servers in order to actually test them to determine the single best server to use. This is done by the application sending pseudo-packets to the last mile optimizer located on each of these 'several best' servers (at 810). The last mile optimizer in response may send back pseudo-packets of data to the application (at 820), or may simply generate feedback for the packets received. The application measures the latency, jitter and packet loss based upon the packet exchange (at 830). These factors are balanced to evaluate voice quality, and the single best server is selected (at 840) based upon the server that will deliver the best voice quality.

Figure 9:
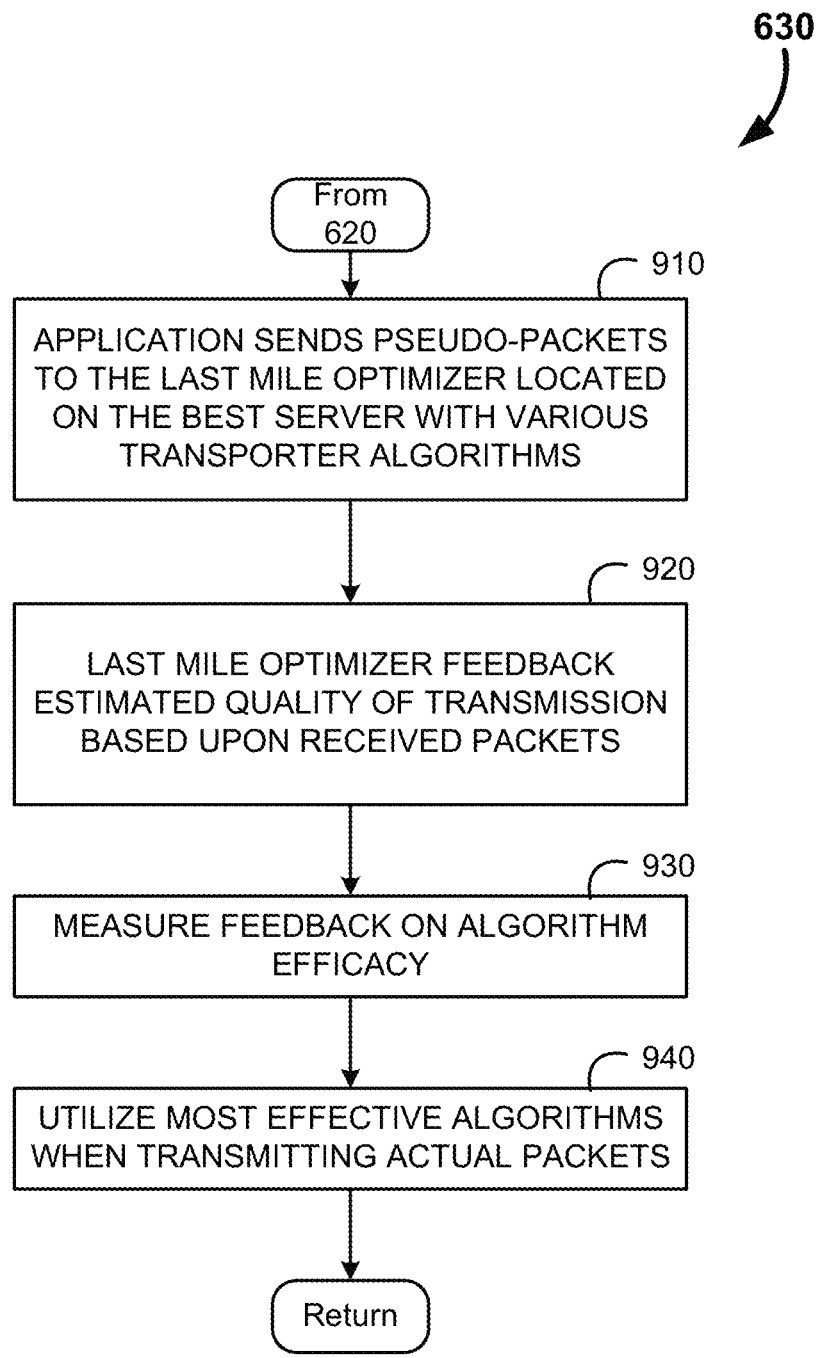
FIG. 9 is an example flow diagram for the sub-process of the wireless optimization for the last mile transmission optimization, in accordance with some embodiment.

Even after the best server has been identified, the process still undergoes wireless optimization (630), provided in reference to FIG. 9, in order to squeeze the very best possible quality out of an imperfect network infrastructure. As previously noted, there are a wide variety of transporter algorithms available to attempt to increase transmission quality. Examples include, for example, modulating jitter buffers, lower bitrate transmission, multiple pathway utilization, etc. It is not always feasible or desirable to utilize each of these transporter algorithms, however. For example, if the pathway employed is clearly superior to all other pathways, employing multiple simultaneous pathway transmissions would not provide any benefit to the transmission quality, and would only increase transmission volumes and processing power. Thus, in such a situation this transporter algorithm wouldn't be desirable. However, a lower bitrate with retransmission may be desired for a pathway with problems with packet loss but low jitter.

Thus, for this wireless optimization (630) the application sends pseudo-packets to the last mile optimizer located on the identified best server with a variety of these transporter algorithms employed (at 910). The last mile optimizer feeds back estimations of the quality of service of a given transmission based upon the received packets (at 920). The feedback is used to measure algorithm efficacy (at 930), and the best algorithms may be selected for usage once the actual call is being conducted (at 940). Thus, for any given network condition, only the best transported algorithms are employed.

The selection of the best transporter algorithms for a server that has been tested to be the best from a subset of candidate servers is the final result of the last mile optimization. At this stage a call may be initialized using the identified server and the identified algorithm, thereby ensuring that the transmission quality between the final edge server and the user's device is as optimal as possible.

Figure 10:
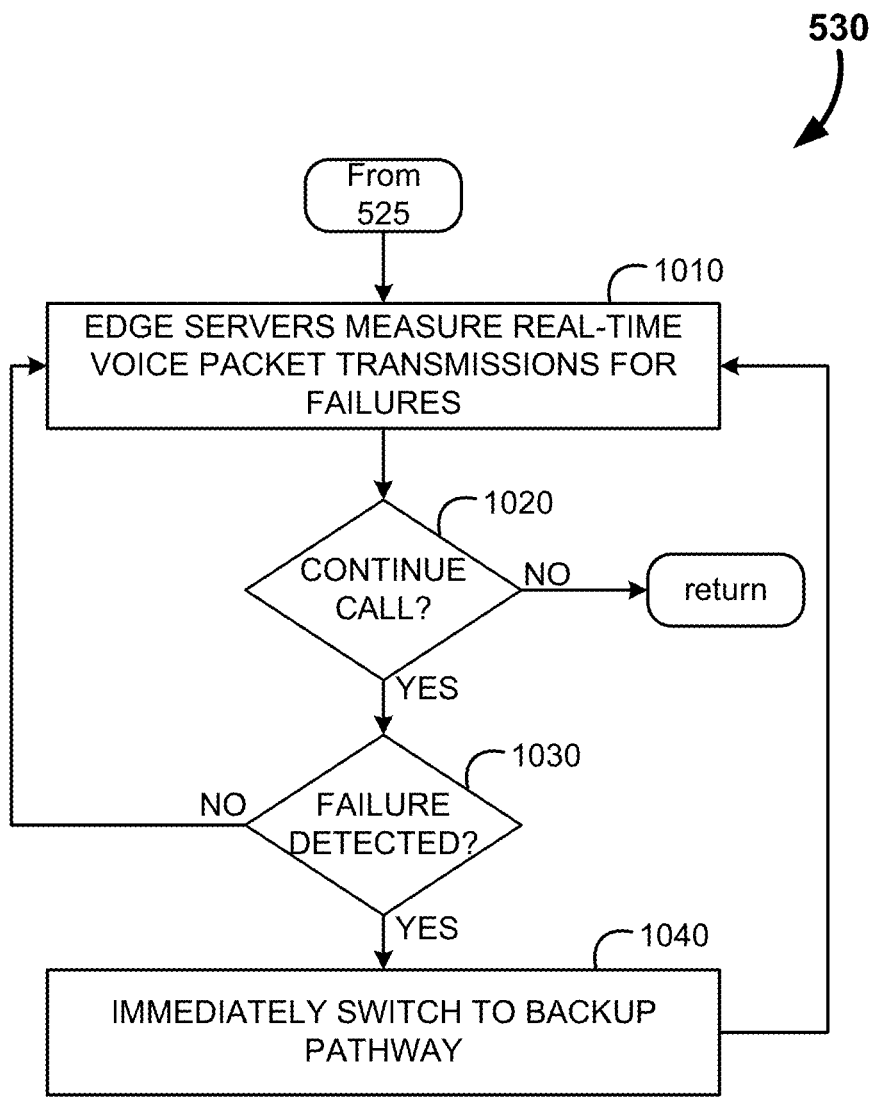
FIG. 10 is an example flow diagram for the sub-process of real-time transmission optimization, in accordance with some embodiment.

Moving on to FIG. 10, further details are provided regarding the real time optimization of an ongoing call, shown generally at 530. As previously noted, although backbone optimization is capable of identifying the best pathway for transmission, the nature of the internet is dynamic, and the conditions of any given pathway may deteriorate based upon loads, equipment malfunctions, damage, or a variety of other causes. When such a change occurs that causes a failure of the pathway being employed for a given call, the real time monitoring of the call quality can re-route the transmission pathways in order to rapidly react to the changing network conditions. Initially the edge servers measure the communication packets in real time for failures (at 1010). At any time the call may be discontinued (at 1020) which ends the process. If a failure is detected (at 1030) then the process immediately switches to one or more backup pathways (at 1040). The process than waits for a new 'best pathway' to be identified by the backbone optimization process, and upon identification of the better pathway may shift the communication packet transmissions to the newly identified pathway (at 1050). The process then returns to monitoring the communications for any failures.

Additionally, as noted previously, the receiver continually measures network conditions even after the transmissions have been initiated. Upon detecting any issues with the network, such as a bandwidth restriction, the receiver may negotiate with the sender to alter the transporter algorithms in order to improve transmission quality.

III. Examples

Figure 11:
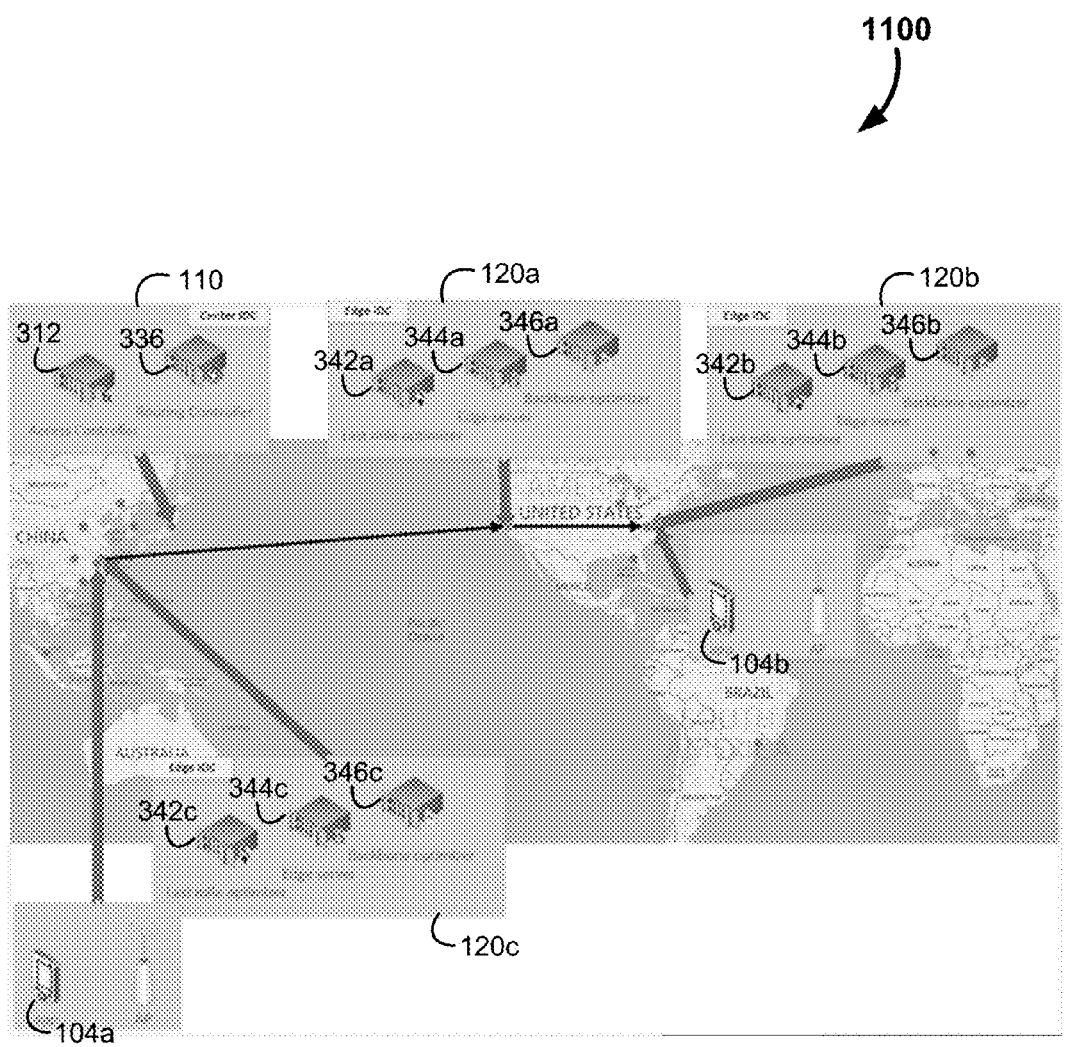
FIG. 11 is an illustration of an example geographic distribution of system components for a trans-pacific call utilizing embodiments of the system for improving communication packet delivery.

Now that the systems and methods for the optimization of communication packet transmission has been described in considerable detail, attention will be turned to various examples of embodiments of the system being employed. To facilitate this discussion, FIG. 11 is an example screenshot for the geographic distribution of the various system components, shown generally at 1100. It should be noted that this example illustration is provided by way of example only, and is intended to clarify without unduly limiting the scope of the disclosure.

Various servers are deployed, in this example, across the planet. Some of the servers are central IDCs 110, but the majority of the servers deployed are edge IDCs 120. The edge IDCs 120 include the last mile optimizer 342 and the edge server/server relay 344. Also as previously discussed, the edge IDCs 120 may include an agent for testing components for failures. The central IDC 110 illustrated also includes the access controller 312 and the routing controller 336.

A device 104*a* may access the internet via an access point, as described previously. In this example, a user in Hangzhou, China would like to talk to another user in New York. The app within the device 104*a* gets some edge servers in Shanghai, Guangzhou, Wuxi, etc. from access controller 312 via the aforementioned general optimization. The app then tests these several servers for the very best ones, and determines which algorithms to employ. This concludes the last mile optimization process. Then, the app sends the best edge server (in the present example the Shanghai edge server 344*c*) voice packets. The Shanghai edge server 344*c* then routes the packets to an edge server in California and then one in Virginia. From the final Virginia edge server, the packets are then provided to the recipient application on the recipient device 104*b*.

Figure 12A:
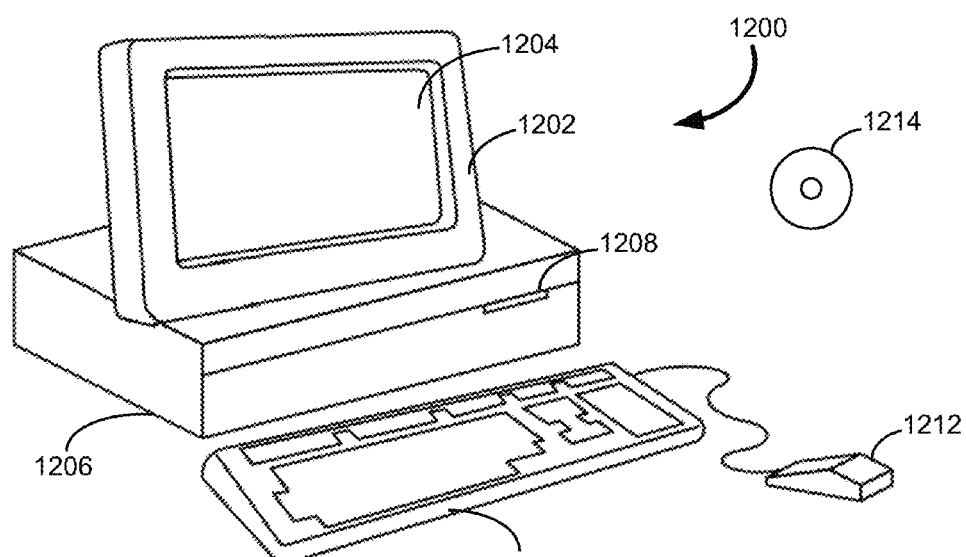
FIGS. 12A and 12B are example computer systems capable of implementing the system for improving communication packet delivery, in accordance with some embodiments.
Figure 12B:
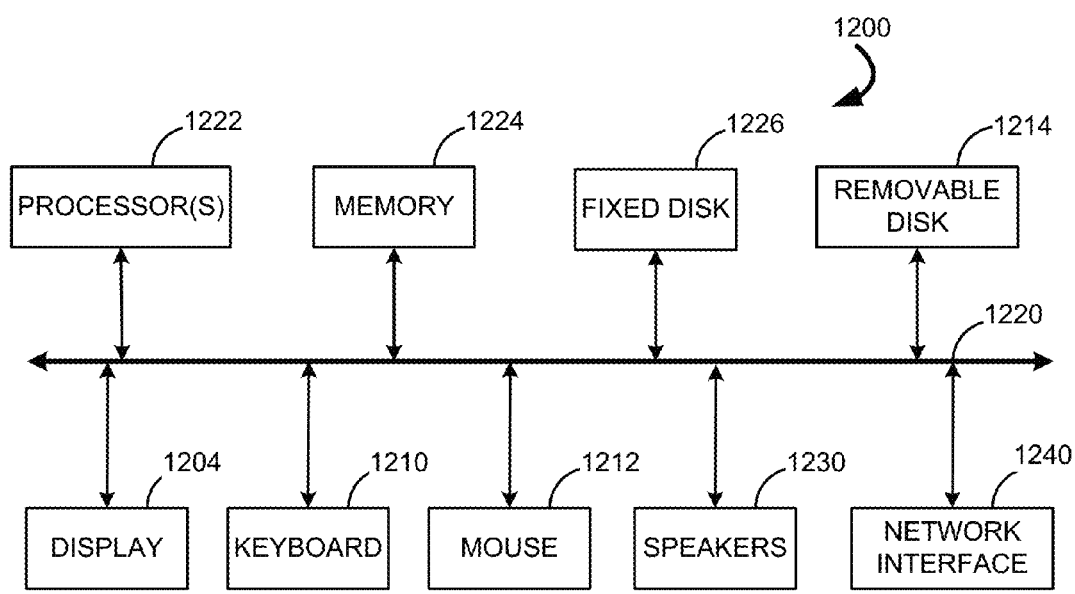

Lastly, FIGS. 12A and 12B illustrate a Computer System 1200, which is suitable for implementing embodiments of the present invention. FIG. 12A shows one possible physical form of the Computer System 1200. Of course, the Computer System 1200 may have many physical forms ranging from a printed circuit board, an integrated circuit, and a small handheld device up to a huge super computer. Computer system 1200 may include a Monitor 1202, a Display 1204, a Housing 1206, a Disk Drive 1208, a Keyboard 1210, and a Mouse 1212. Disk 1214 is a computer-readable medium used to transfer data to and from Computer System 1200.

FIG. 12B is an example of a block diagram for Computer System 1200. Attached to System Bus 1220 are a wide variety of subsystems. Processor(s) 1222 (also referred to as central processing units, or CPUs) are coupled to storage devices, including Memory 1224. Memory 1224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1226 may also be coupled bi-directionally to the Processor 1222; it provides additional data storage capacity and may also include any of the computer-readable media described below. Fixed Disk 1226 may be used to store programs, data, and the like and is typically a secondary storage medium (such as a hard disk) that is slower than primary storage. It will be appreciated that the information retained within Fixed Disk 1226 may, in appropriate cases, be incorporated in standard fashion as virtual memory in Memory 1224. Removable Disk 1214 may take the form of any of the computer-readable media described below.

Processor 1222 is also coupled to a variety of input/output devices, such as Display 1204, Keyboard 1210, Mouse 1212 and Speakers 1230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1222 optionally may be coupled to another computer or telecommunications network using Network Interface 1240. With such a Network Interface 1240, it is contemplated that the Processor 1222 might receive information from the network, or might output information to the network in the course of performing the above-described packet transmission optimization. Furthermore, method embodiments of the present invention may execute solely upon Processor 1222 or may execute over a network such as the Internet in conjunction with a remote CPU that shares a portion of the processing.

In sum, the present invention provides systems and methods for the improved transmission of communication packets utilizing last mile optimizations, and real time optimization of packet transmission. The advantages of such systems include the ability to improve voice and/or video communications over an imperfect internet infrastructure, especially over large distances (such as transcontinental communications).

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized last mile optimization system comprising:
    several best edge servers, each edge server including a last mile optimizer; and
    an application, at a user equipment, configured to test each of the edge servers by sending pseudo-packets to the last mile optimizer located at each of the several best servers to identify a single best edge server for transmission, wherein the application is further configured to transmit a plurality of pseudo-packets where each one of a plurality of transporter algorithms have been applied to identify effective transporter algorithms; wherein the transporter algorithms include retransmission algorithms, Forward Error Correction (FEC), simultaneous pathway, lower the encoder bitrate, sending multiple voice frames in a single packet, adaptive jitter buffering and Path Loss Concealment (PLC); wherein the application is further configured to combine together the algorithms shown to be effective for a real-time data transmission.

2. The last mile optimization system of claim 1, wherein jitter, latency and packet loss are measured for the transmitted pseudo-packets to determine quality of service for each of the several best edge servers.

3. The last mile optimization system of claim 2, wherein identifying the single best edge server includes balancing the latency, jitter and packet loss measurements to estimate quality of service for each of the several best edge servers.

4. The last mile optimization system of claim 1, wherein the application is further configured to transmit real-time data packets via the single best edge server.

5. The last mile optimization system of claim 4, further comprising a monitor configured to continuously measure transmission quality, and upon detection of a problem switching transmission of the real-time data packets from the single best edge server to at least one of the several best edge servers.

6. The last mile optimization system of claim 4, further comprising a negotiation mechanism configured to detect changes in the transmission jitter, latency and packet loss, and negotiating optimized transporter algorithms, including altering encoding and bitrate of the transmission.

7. A computerized last mile optimization method comprising:
    sending pseudo-packets to a last mile optimizer located at each of several best servers; receiving feedback from each of the last mile optimizers;
    selecting the single best server from the several best servers based on the feedback;
    applying each one of a plurality of transporter algorithms to pseudo-packets sent to the single best server;
    and measuring quality of service for each transporter algorithm to determine which are effective;
    wherein the transporter algorithms include retransmission algorithms, Forward Error Correction (FEC), simultaneous pathway, lower the encoder bitrate, sending multiple voice frames in a single packet, adaptive jitter buffering and Path Loss Concealment (PLC); and combining together the algorithms shown to be effective for a real-time data transmission.

8. The method of claim 7, wherein jitter, latency and packet loss are measured for the transmitted pseudo-packets to determine quality of service for each of the several best edge servers.

9. The method of claim 8, wherein identifying the single best edge server includes balancing the latency, jitter and packet loss measurements to estimate quality of service for each of the several best edge servers.

10. The last mile optimization system of claim 7, further comprising transmitting real-time data packets via the single best edge server.

11. The method of claim 10, further comprising continuously measuring transmission quality, and upon detection of a problem switching transmission of the real-time data packets from the single best edge server to at least one of the several best edge servers.

12. The method of claim 10, further comprising detecting changes in the transmission jitter, latency and packet loss, and negotiating optimized transporter algorithms, including altering encoding and bitrate of the transmission.

\* \* \* \* \*